United States Patent
Frey et al.

(10) Patent No.: US 8,912,793 B2
(45) Date of Patent: Dec. 16, 2014

(54) LINEAR POSITION MEASURING SYSTEM AND METHOD FOR DETERMINING THE ABSOLUTE POSITION OF A CARRIAGE ALONG A SLIDE RAIL

(75) Inventors: Stefan Frey, Simmersfeld (DE); Klaus-Dieter Goetz, Sersheim (DE)

(73) Assignee: Schneeberger Holding AG (CH)

( * ) Notice: Subject to any disclaimer, the term of this patent is extended or adjusted under 35 U.S.C. 154(b) by 296 days.

(21) Appl. No.: 13/484,574

(22) Filed: May 31, 2012

(65) Prior Publication Data
US 2012/0313624 A1    Dec. 13, 2012

(30) Foreign Application Priority Data

Jun. 10, 2011 (EP) .................................... 11405267

(51) Int. Cl.
  *G01B 7/14* (2006.01)
  *G01D 5/347* (2006.01)
  *G01D 5/244* (2006.01)
  *G01D 5/245* (2006.01)

(52) U.S. Cl.
  CPC ........ *G01D 5/34746* (2013.01); *G01D 5/24466* (2013.01); *G01D 5/2457* (2013.01)
  USPC .................................. 324/207.24; 250/231.1

(58) Field of Classification Search
  USPC ......................................... 324/207.2–207.24
  See application file for complete search history.

(56) References Cited

U.S. PATENT DOCUMENTS 7,089,678 B2 * 8/2006 Novak et al. ..................... 33/706
2008/0265826 A1 * 10/2008 Sasaki et al. ................... 318/687

FOREIGN PATENT DOCUMENTS

EP    1978633 A2   10/2008
WO   03/058172 A2   7/2003

OTHER PUBLICATIONS

The above references were cited in a European Search Report issued on Dec. 2, 2011, enclosed without an English Translation, that issued in the corresponding European Patent Application No. 11405267.3.

* cited by examiner

*Primary Examiner* — Jay Patidar
(74) *Attorney, Agent, or Firm* — Cowan, Liebowitz & Latman, P.C.; Mark Montague

(57) ABSTRACT

A linear position measuring system and a method for determining an absolute position of a carriage along a slide rail are disclosed. An analog signal progression (S) based at on at least one reference point is here discretely scanned in response to a first threshold (SW1) and second threshold (SW2). The resultant digital values are stored in a first measured value register (MR1) and a second measured value register (MR2). The contents of the first and second measured value register (MR1, MR2) are compared with the respective contents of a first and second set measured value register. The reference point is output as an ideal reference point if the differential value lies within a predetermined tolerance range, and is otherwise discarded.

14 Claims, 3 Drawing Sheets

LINEAR POSITION MEASURING SYSTEM AND METHOD FOR DETERMINING THE ABSOLUTE POSITION OF A CARRIAGE ALONG A SLIDE RAIL

REFERENCE TO RELATED APPLICATIONS

This application claims priority to European Patent Application No. 11405267.3, filed Jun. 10, 2011, the disclosure of which is incorporated herein by reference.

BACKGROUND OF THE INVENTION

The invention relates to a linear position measuring system and to a method for determining the absolute position of a carriage along a slide rail.

For example, systems for determining the position of a carriage are used in combination with guide systems, e.g., linear guides, which encompass a first body and a second body guided on the first body that can move relative to the first body, and here have the job of making it possible to determine the position of the second body relative to the first body. To this end, for example, a measuring scale of the respective device for determining a position can be fixed in place relative to the first body, for example, and a respective scanner can be fixed in place relative to the second body.

For example, there are linear position measuring systems known in the art for determining an absolute position that encompass the measuring scale marked with measuring points and a scanner that can move relative to the measuring scale for scanning the respective measuring points. For example, these measuring points consist of one or more acquirable markings to identify a position. The markings can be acquired optically or magnetically, for example.

In optical scanning, the scanner encompasses a sensor for acquiring an image of the measuring points and providing signals making it possible to determine the position of the scanner relative to the measuring scale. In magnetic scanning, the scanner encompasses a magnetic field sensor for acquiring a magnetic field progression of individual permanent magnets, which in this case make up the measuring points of the measuring scale.

Depending on the respective measuring scale (optical/magnetic), these types of systems can be used, for example, to measure a relative change in the position of the scanner in relation to an initial position, or to record an absolute position of the scanner.

To reach a point where these types of systems become able to measure relative changes in position of the scanner in relation to the measuring scale, for example, the respective measuring scale can be designed as an incremental scale, and consequently acquire a sequence of several identical, periodically arranged markings spaced apart at equal distances along a prescribed line or measuring scale. For example, to enable the optical scanning of such an incremental measuring scale, the scanner can project an optical image of the respective markings onto a sensor in the form of a photoelectric detector. To measure relative changes in position of the scanner in relation to the measuring scale, the scanner is moved along the track of markings. Moving the scanner here causes a signal to change periodically, for example providing information about how many markings the scanner passed by.

In addition, signals recorded for various positions of the scanner along the track of markings can be interpolated, making it possible to determine the position of the scanner relative to the markings to within an inaccuracy of less than the distance between adjacent markings.

In sum, the respective change in the relative position of the scanner can be determined by scanning the measuring points of an incremental measuring scale. So-called incremental position encoders are used for this purpose, which have a comparatively simple design. They offer relatively high resolutions.

Aside from acquiring the relative movement between the slide rail and track carriage or scanner, the system can also be designed to determine an absolute position of the scanner in relation to a reference scale. The respective absolute position of the scanner can here be determined at any location along the slide rail by measuring a change in the relative position of the scanner in relation to a specific reference point. The reference point must here be scanned in an especially reliable manner, since any misinterpretation would lead to completely erroneous information about the position of the carriage in relation to the slide rail.

To this end, the reference scale can exhibit one or more reference points along a predetermined line, which each specify a certain absolute position. In order to determine the position, the aforementioned scanner can be moved along the predetermined line, so as to optically or magnetically scan the respective reference points by means of the scanner.

In sum, these so-called absolute encoders always transmit the position-related information in its entirety, which makes them very well suited for determining and controlling position. The conventional approach involves reading out a piece of binary information, wherein a corresponding optical or magnetic scan is needed for each binary digit. All of these scans must be adjusted relative to each other so that no read error can arise under any circumstances. As the requirements placed on scanning accuracy become ever more stringent, the computation time and power consumption for this purpose increase.

In the past, the reference points were evaluated using only a simple threshold circuit. Exceeding the threshold causes the function to be digitized. The advantage to this is that plausibility examinations can be performed. The reference signal is here generated by a half bridge. In terms of practical implementation, this half bridge can be realized in the form of the north/south pole of a permanent magnet. An alternating signal results from scanning the magnetic field of a permanent magnet during the relative movement of a scanner along the permanent magnet. For example, the threshold can be set as a function of the desired sensitivity and the amplitude of the alternating signal, or the distance between the peak values (peak-peak). The distance between the peak values can here be influenced by the magnetization width. The position of the peak values is here independent of the measuring signal strength.

One problem in this approach toward determining the position by scanning the reference point is that the reference pulse width can be varied in relation to the signal amplitude. In the event of a super-elevated signal amplitude, this can result in a reference pulse that is too wide for reliable evaluation. By contrast, if the signal amplitude is too low, reference pulse detection may be mistakenly omitted altogether.

Another problem lies in the occurrence of overshoots. In practice, an output variable will not reach the desired value after a sudden change in an input variable, e.g., the magnetic field of the permanent magnets, but rather will overshoot the set value, and only adjust or settle into the desired value thereafter. In cases where the reference point is acquired by scanning a magnetic field progression, this phenomenon arises primarily when the reference sensor is in a highly saturated region. As a result, magnetic field lines can be acquired that emerge in the near field of the reference pulse in the opposite direction. This distorts the result of reference point scanning.

Another problem associated with acquiring the reference point by scanning a magnetic field progression is that mechanical tools with a residual magnetization can apply magnetic poles to the reference track after the fact. Since these imposed interferences result in magnetic poles having a respective width longer than the width of the permanent magnets of the reference track, this leads to a lower amplitude. In addition, the distance between the peak values is reduced. The measuring result of the reference point scan as a whole are greatly distorted as a result.

OBJECTS AND SUMMARY OF THE INVENTION

The object of the present invention is to provide a linear position measuring system for determining an absolute position of a carriage along a slide rail in which these problems of prior art are resolved.

A linear position measuring system for determining an absolute position of a carriage along a slide rail contains a reference scale placed along the slide rail and a scanner secured to the track carriage. The scanner is designed to scan reference points along the reference scale, wherein the reference points are scanned as an essentially analog signal progression, which consists of sequential first and second signal half-wave progressions. The linear position measuring system further encompasses at least one threshold storage device for storing a first and second threshold, whose levels are varyingly adjustable relative to each other. The linear position measuring system further encompasses a first comparator for comparing the scanned values of the first signal half-wave progression with the first threshold in a sectional interval of the first signal half-wave progression, and to output: those scanned values of the first signal half-wave progression that are less than the first threshold to a first measured value register for storing those values as a first discrete SW1 half-wave bit value, and those scanned values of the first signal half-wave progression that are greater than the first threshold to the first measured value register for storing those values as a second discrete SW1 half-wave bit value. The linear position measuring system further encompasses a second comparator for comparing the scanned values of the second signal half-wave progression with the second threshold in a sectional interval of the second signal half-wave progression, and to output: those scanned values of the second signal half-wave progression that are less than the second threshold to a second measured value register for storing those values as a first discrete SW2 half-wave bit value, and those scanned values of the second signal half-wave progression that are greater than the second threshold to the second measured value register for storing those values as a second discrete SW2 half-wave bit value. The linear position measuring system further contains a first set measured value register for storing set measured values for the values in the sectional interval of the first signal half-wave progression, and a second set measured value register for storing set measured values for the values in the sectional interval of the second signal half-wave progression, wherein the measured value registers and set measured value registers exhibit an identical bit length. The linear position measuring system further contains at least one logical comparison module for comparing the respective contents of the first and second measured value register with the contents of the first and second set measured value register, and for outputting a differential value from this comparison. The linear position measuring system further contains a tolerance range comparator for comparing the differential value with a predetermined tolerance range, and, based on this comparison, to acquire and output each reference point as an ideal reference point if the differential value lies within a predetermined tolerance range.

One significant advantage is that this yields a redundant reference point acquisition that enables a precise definition of the reference pulse flanks. This makes it possible to check the plausibility of the acquired values. Another advantage lies in the fact that scanning is a particularly energy-efficient process, so that the power required for this purpose can be supplied from at least one battery or an accumulator. As opposed to conventional linear position measuring systems, this advantageously eliminates the need to provide electrical lines to supply power. The contents of the measured value register (MR1, MR2) can be maps of the function f(x)=reference value>SW1 and f(x)=reference value<SW2.

The reference points are preferably designed as individual permanent magnets, whose respective magnetic field progression can be scanned by the scanner. This enables particularly accurate scanning, since magnetic field scanning is especially insusceptible to interference by comparison to other scanning methods. In addition, scanning can take place at an especially fine resolution, since the permanent magnets can have a particularly narrow width in comparison to other configurations for scanning points.

The reference points are preferably designed as optical markings, which can be scanned by the scanner. Markings applied to the reference track are here scanned by optical reading heads. This optical scanning is especially cost-effective to realize in comparison to other scanning methods.

The set measured values are preferably based on at least one error detection simulation. This prevents the acquisition of distorted signal patterns based on an injected interference, for example by magnetic tools. This ensures pure signal scanning.

The respective first threshold level and second threshold level are preferably based on at least one error detection simulation. The linear position measuring system can be configured to store more than the first and second threshold. For example, the first and second signal half-wave progressions can sequentially follow a sinusoidal wave progression. The values for the first signal half-wave progression can here assume positive values, and the values for the second signal half-wave progression can assume negative values. In this example, the first threshold can be set to a positive level, and the second threshold can be set to a negative level. An especially finely tuned adjustment is enabled overall for achieving a highly accurate scanning.

The linear position measuring system is preferably designed to prescribe the scanning time based on the reference points at multiples of a 180° angle. The incremental values here prescribe the scanning time at angles of 0°, 180°, 360°, etc.

The linear position measuring system is preferably designed to interpolate the reference point given a shift in the scanning point angle. One advantage lies in the fact that a reliable position determination is still possible even given a shift in the scanning point angle, for example owing to carriage acceleration. For example, the angle can be shifted by 20°, 200°, etc.

The aforementioned object is also achieved by means of a method for determining an absolute position of a carriage along a slide rail, with a reference scale placed along the slide rail and a scanner secured to the track carriage. The scanner scans at least one reference point along the reference scale, wherein the reference point is scanned as an essentially analog signal progression, which consists of sequential first and second signal half-wave progressions. The method involves the following steps:

a) Storing at least one first threshold and one second threshold, wherein their levels are varyingly adjusted relative to each other, b) In a sectional interval of the first signal half-wave progression:

Comparing the scanned values of the first signal half-wave progression with the first threshold by means of a first comparator, Outputting those scanned values of the first signal half-wave progression that are less than the first threshold to a first measured value register, and storing those values as a first discrete SW1 half-wave bit value, Outputting those scanned values of the first signal half-wave progression that are greater than the first threshold to the first measured value register, and storing those values as a second discrete SW1 half-wave bit value, c) In a sectional interval of the second signal half-wave progression:

Comparing the scanned values of the second signal half-wave progression with the second threshold by means of a second comparator, Outputting those scanned values of the second signal half-wave progression that are less than the second threshold to a second measured value register, and storing those values as a first discrete SW2 half-wave bit value, Outputting those scanned values of the second signal half-wave progression that are greater than the second threshold to the second measured value register, and storing those values as a second discrete SW2 half-wave bit value, d) Storing set measured values for the values in the sectional interval of the first signal half-wave progression, and set measured values for the values in the sectional interval of the second signal half-wave progression in a respective first and second set measured value register, wherein the measured value registers and set measured value registers exhibit an identical bit length, e) Comparing the respective contents of the first and second measured value register with the contents of the first and second set measured value register by means of a logical comparison module, and outputting a differential value from this comparison, and f) Comparing the differential value with a predetermined tolerance range by means of a tolerance range comparator and, based on this comparison, acquiring and outputting each reference point as an ideal reference point if the differential value lies within a predetermined tolerance range.

One significant advantage to the method according to the invention is that it yields a redundant reference point acquisition that enables a precise definition of the reference pulse flanks. This makes it possible to continuously check the plausibility of the acquired values. Another advantage lies in the fact that scanning can be done in a particularly energy-efficient manner. As a result, the power required for reference point acquisition can be supplied from at least one battery or an accumulator. This advantageously eliminates the need to install electrical lines to supply power.

The reference points are preferably designed as individual permanent magnets, whose respective magnetic field progression is scanned by the scanner. This enables particularly accurate scanning, since magnetic field scanning is especially insusceptible to interference by comparison to other scanning methods. In addition, scanning can take place at an especially fine resolution, since the permanent magnets can have a particularly narrow width in comparison to other configurations for scanning points.

The reference points are preferably designed as optical markings, which are scanned by the scanner. In this method, optically detectable markings applied to the reference scale are scanned by optical reading heads. This type of scanning is especially cost-effective to realize in comparison with other scanning methods.

The method preferably further involves the step of generating the set measured values based on at least one error detection simulation. This prevents the acquisition of distorted signal patterns in advance. Such distorted signal patterns can be based on an injected magnetic interference, for example caused by magnetic tools. This ensures an overall pure signal scanning.

The method preferably further involves the step of generating at least the level of the first threshold and the level of the second threshold based on at least one error detection simulation. This enables an especially finely tuned adjustment for achieving a highly accurate scanning.

The scanning time is preferably prescribed based on the reference points at multiples of a 180° angle. As a consequence, the incremental values prescribe the scanning time at angles of 0°, 180°, 360°, etc.

The reference point is preferably interpolated given a shift in the scanning point angle. As a result, a reliable position determination is still permanently ensured even given a shift in the scanning point angle, for example owing to carriage acceleration. For example, the angle can be shifted by 20°, 200°, etc.

Various other objects, advantages and features of the present invention will become readily apparent to those of ordinary skill in the art, and the novel features will be particularly pointed out in the appended claims.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which.

DETAILED DESCRIPTION OF THE INVENTION

Figure 1:
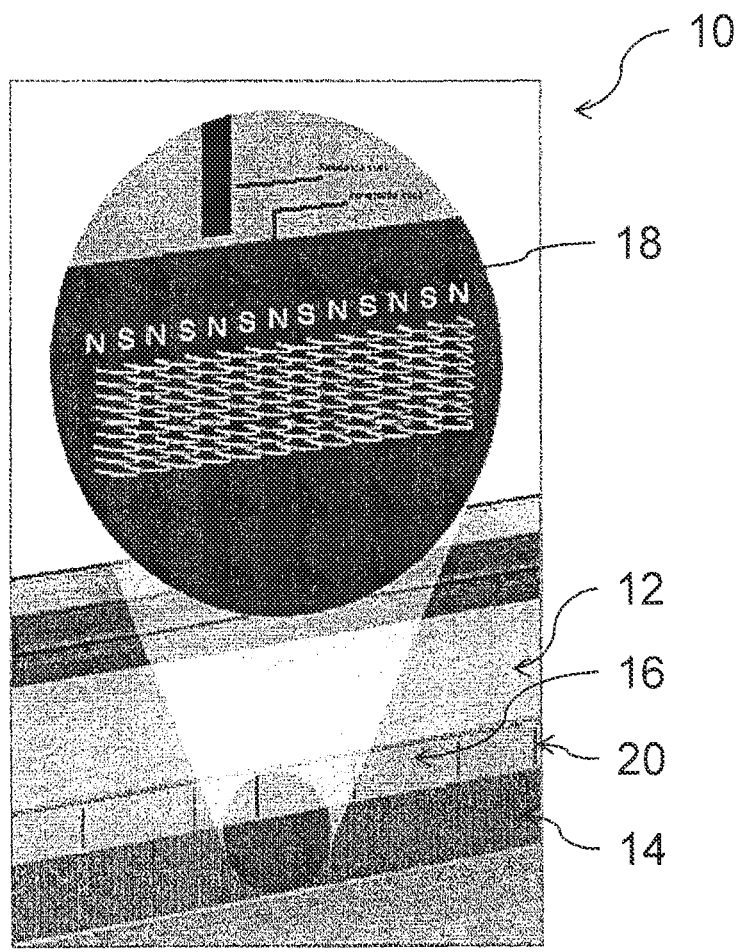
FIG. 1 is a detailed view of a linear position measuring system, which depicts a magnified section of a slide rail.

FIG. 1 presents a detailed view of a linear position measuring system 10, which depicts a magnified flank section of a slide rail 12 of the linear position measuring system 10. The slide rail 12 is used to guide a carriage, to which a scanner is fixedly secured (neither is shown). An incremental scale 14 and a reference scale 16 are applied to the flank of the slide rail 12.

The incremental scale 14 consists of adjacently arranged permanent magnets 18, which are alternately aligned in the N-S, N-S, etc. direction. By way of illustration, the resultant magnetic field progressions are schematically depicted.

In order to be able to measure relative changes in position of the scanner in relation to the incremental scale 14, the carriage with the scanner is moved along the track of the permanent magnets 18. The scanner movement here results in a periodic change in a measuring signal in response to the magnetic field progression of the individual permanent magnets 18. This periodic change in the measuring signal provides information about the number of permanent magnets 18 by which the scanner was moved. This in turn gives an indication of the distance traversed by the carriage in relation to the slide rail 12 and time.

The reference scale 16 also secured to the slide rail 12 contains individual reference points 20, which are arranged in such a way that an absolute position of the scanner can be determined in relation to the reference scale 16. The respective absolute position of the scanner can here be determined at any location along the slide rail 12 by measuring a change in relative position of the scanner in relation to a specific (e.g., coded) reference point 20. The reference points 20 must here be scanned in an especially reliable manner, since any misinterpretation would lead to completely erroneous information about the position of the carriage in relation to the slide rail 12.

Figure 2:
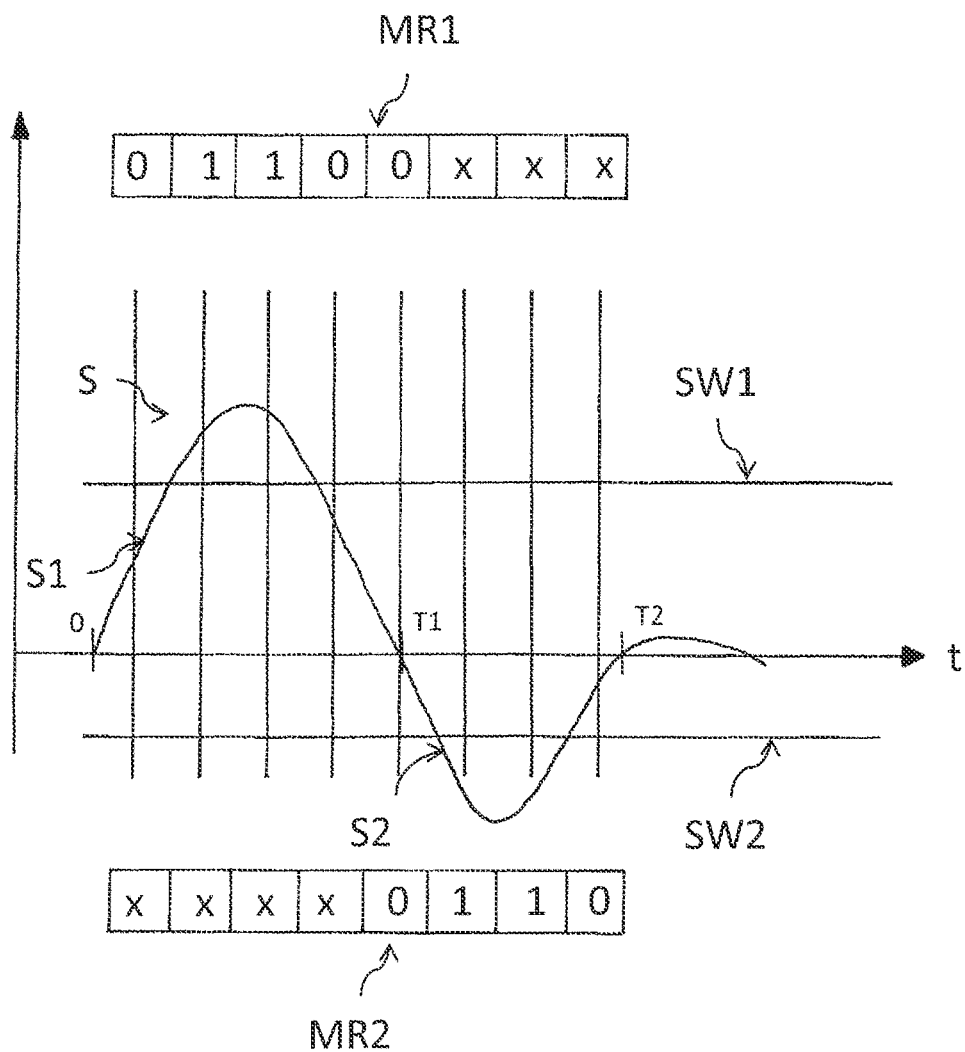
FIG. 2 is an analog signal progression resulting in response to a magnetic field progression that is scanned by means of a scanner in the linear position measuring system guided along a reference scale.

FIG. 2 shows an analog signal progression S resulting in response to a magnetic field progression of a reference point that is scanned by means of a scanner guided along a reference scale (neither is shown). According to the invention, a first threshold SW1 and a second threshold SW2 are set and stored.

In a timeframe (t=0 to T1) of positive half-wave values for the signal progression S, which is referred to as the first signal half-wave progression S1, those scanned values of the analog signal progression S that are less than the first threshold SW1 are stored as a first discrete SW1 half-wave bit value. In the example shown on the figure, this value assumes the binary value "0". This binary value "0" is stored in a first measured value register MR1.

In the timeframe of positive half-wave values (t=0 to T1) for the signal progression S (first signal half-wave progression S1), those scanned values of the analog signal progression S that are greater than the first threshold SW1 are stored as a second discrete SW1 half-wave bit value. In the example shown on the figure, this value assumes the binary value "1". This binary value "1" is also stored in the first measured value register MR1. Therefore, the bit sequence (content) 01100xxx is stored in the measured value register MR1.

Further, in a timeframe (t=T1 to T2) of negative half-wave values for the analog signal progression S, which is referred to as the second signal half-wave progression S2, those scanned values of the analog signal progression S that are greater than the second threshold SW2 are stored as a first discrete SW2 half-wave bit value. In the example shown on the figure, this value assumes the binary value "0". This binary value "0" is stored in a second measured value register MR2.

In the timeframe (t=T1 to T2) of negative half-wave values for the analog signal progression S (second signal half-wave progression S2), those scanned values of the analog signal progression S that are less than the second threshold SW2 are stored as a second discrete SW2 half-wave bit value. In the example shown on the figure, this value assumes the binary value "1". This binary value "1" is stored in the second measured value register MR2. Therefore, the bit sequence (content) xxxx0110 is stored in the measured value register MR2.

The linear position measuring system further incorporates a first set measured value register and a second set measured value register (neither is shown), which each store respective set measured values for the values in the timeframe of positive half-wave values (first signal half-wave progression S1) and set measured values for the values in the timeframe of negative half-wave values (second signal half-wave progression S2). These set measured values are based on simulations. The measured value registers MR1, MR2 and the set measured value registers can each exhibit an identical bit length.

A logical comparison module, for example a comparator, compares the respective contents of the first and second measured value register MR1, MR2 with the contents of the first and second set measured value register. For example, the first set measured value register stores the bit sequence 01100xxx, and the second set measured value register stores the bit sequence xxxx0110. In this example, as a result of comparing the stored contents of the first set measured value register with the contents stored in the first measured value register MR1, the logical comparison module outputs a signal indicating a correlation between the contents (plausibility). In addition, as a result of comparing the stored contents of the second set measured value register with the contents stored in the second measured value register MR2, the logical comparison module outputs a signal indicating a correlation between the contents.

Based on this comparison (complete correlation), the linear position measuring system thus acquires the scanned reference point of the reference pattern as an ideal reference point. The linear position measuring system can be designed to acquire the reference point of the reference pattern as an ideal reference point even if the comparison yields an incomplete correlation, but the difference between the stored contents of the first and/or second set measured value register and the contents stored in the first and/or second measured value register MR1, RM2 lies within a predetermined tolerance range.

However, if this difference lies outside the predetermined tolerance range, the linear position measuring system is designed to discard the acquired signal progression. In other words, the linear position measuring system is configured not to take into account this signal progression as a reference point. As a result, the linear position measuring system is prevented from erroneously acquiring a signal progression, for example arising from an overshoot or residual magnetization, as the reference point. This tangibly increases the overall reliability of reference point acquisition. The reduced scanning rate by comparison to prior art also clearly reduces power consumption by the scanner. This advantageously enables the scanner to derive its power from an accompanying battery or an accumulator.

Figure 3:
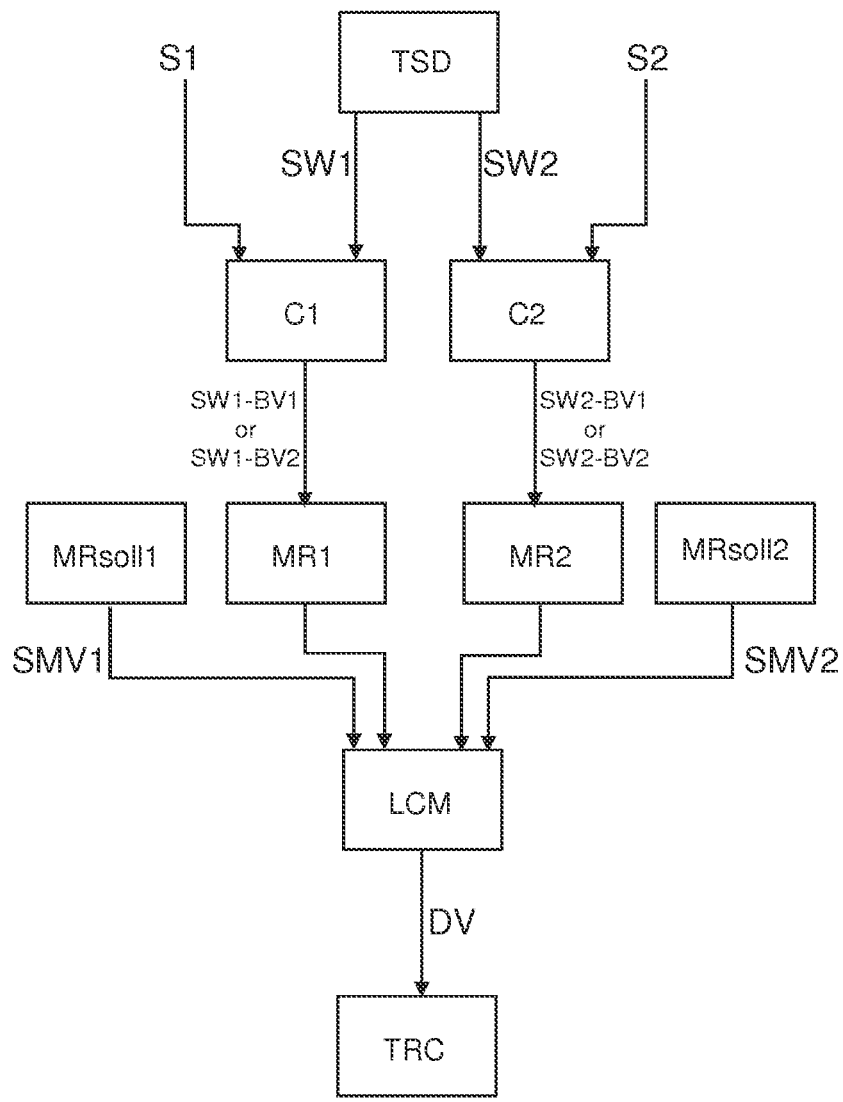
FIG. 3 is a block diagram of the linear position measuring system.

FIG. 3 shows a block diagram of the linear position measuring system 10. The linear position measuring system 10 includes: a) At least one threshold storage device TSD for storing a first and second threshold SW1 and SW2, whose levels can be varyingly adjusted relative to each other; b) a first comparator C1 for comparing the scanned values of the first signal half-wave progression S1 with the first threshold SW1 in a sectional interval of the first signal half-wave progression S1, and to output; those scanned values of the first signal half-wave progression S1 that are less than the first threshold SW1 to a first measured value register MR1 for storing those values as a first discrete SW1 half-wave bit value SW1-BV1, and those scanned values of the first signal half-wave progression S1 that are greater than the first threshold SW1 to the first measured value register MR1 for storing those values as a second discrete SW1 half-wave bit value SW1-BV2; c) a second comparator C2 for comparing the scanned values of the second signal half-wave progression S2 with the second threshold SW2 in a sectional interval of the second signal half-wave progression S2, and to output; those scanned values of the second signal half-wave progression S2 that are less than the second threshold SW2 to a second measured value register MR2 for storing those values as a first discrete SW2 half-wave bit value SW2-BV1, and those scanned values of the second signal half-wave progression S2 that are greater than the second threshold SW2 to the second measured value register MR2 for storing those values as a second discrete SW2 half-wave bit value SW2-BV2; d) a first set measured value register MRsoll1 for storing set measured values SMV1 for the values in the sectional interval of the first signal half-wave progression S1, and a second set measured value register MRsoll2 for storing set measured values SMV2 for the values in the sectional interval of the second signal half-wave progression S2, wherein the measured value registers MR1, MR2 and set measured value registers MRsoll1, MRsoll2 exhibit an identical bit length; e) at least one logical comparison module LCM for comparing the respective contents of the first and second measured value register MR1, MR2 with the contents of the first and second set measured value register MRsoll1, MRsoll2, and for outputting a differential value DV from this comparison; and f) a tolerance range comparator TRC for comparing the differential value DV with a predetermined tolerance range, and, based on this comparison, to acquire and output each reference point 20 as an ideal reference point if the differential value lies within a redetermined tolerance range.

The present invention has been described in the context of a number of embodiments, and multiple variations and examples thereof. It is to be understood, however, that other expedients known to those skilled in the art or disclosed herein may be employed without departing from the spirit of the invention.

Therefore, it is intended that the appended claims be interpreted as including the embodiments described herein, the alternatives mentioned above, and all equivalents thereto.

What is claimed is:

1. A linear position measuring system for determining an absolute position of a carriage along a slide rail, with a reference scale placed along the slide rail and a scanner secured to the track carriage, wherein the scanner is designed to scan reference points along the reference scale, wherein the reference points are scanned as an essentially analog signal progression (S), which consists of sequential first and second signal half-wave progressions (S1, S2), characterized in that the linear position measuring system further encompasses:
    a) at least one threshold storage device for storing a first and second threshold (SW1, SW2), whose levels are varyingly adjustable relative to each other,
    b) a first comparator for comparing the scanned values of the first signal half-wave progression (S1) with the first threshold (SW1) in a sectional interval of the first signal half-wave progression (S1), and to output:
    those scanned values of the first signal half-wave progression (S1) that are less than the first threshold (SW1) to a first measured value register (MR1) for storing those values as a first discrete SW1 half-wave bit value, and
    those scanned values of the first signal half-wave progression (S1) that are greater than the first threshold (SW1) to the first measured value register (MR1) for storing those values as a second discrete SW1 half-wave bit value,
    c) a second comparator for comparing the canned values of the second signal half-wave progression (S2) with the second threshold (SW2) a sectional interval of the second signal half-wave progression (S2), and to output:
    those scanned values of the second signal half-wave progression (S2) that are less than the second threshold (SW2) to a second measured value register (MR2) for storing those values as a first discrete SW2 half-wave bit value, and
    those scanned values of the second signal half-wave progression (S2) that are greater than the second threshold (SW2) to the second measured value register (MR2) for storing those values as a second discrete SW2 half-wave bit value,
    d) a first set measured value register (MRsoll1) for storing set measured values for the values in the sectional interval of the first signal half-wave progression (S1), and a second set measured value register (MRsoll2) for storing set measured values for the values in the sectional interval of the second signal half-wave progression (S2), wherein the measured value registers (MR1, MR2) and set measured value registers (MRsoll1, MRsoll2) exhibit an identical bit length,
    e) at least one logical comparison module for comparing the respective contents of the first and second measured value register (MR1, MR2) with the contents of the first acrd second set measured value register (MRsoll1, MRsoll2), and for outputting a differential value from this comparison, and
    f) a tolerance range comparator for comparing the differential value with a predetermined tolerance range, and, based on this comparison, to acquire and output each reference point (20) as an ideal reference point if the differential value lies within a predetermined tolerance range.

2. The linear position measuring system according to claim 1, in which the reference points are designed as individual permanent magnets, whose respective magnetic field progression scanned by the scanner.

3. The linear position measuring system according to claim 1, in which the reference points are designed as optical markings, which are scanned by the scanner.

4. The linear position measuring system according to claim 1, in which the set measured values are based on at least one error detection simulation.

5. The linear position measuring system according to claim 1, in which the respective level of the first threshold (SW1) and level of the second threshold (SW2) are based on at least one error detection simulation.

6. The linear position measuring system according to claim 1, which is designed to prescribe the scanning time based on the reference points at multiples of a 180° angle.

7. The linear position measuring system according to claim 6, which is designed to interpolate the reference point given a shift in the scanning point angle.

8. A method for determining an absolute position of a carriage along a slide rail, with a reference scale placed along the slide rail and a scanner secured to the track carriage, wherein the scanner scans at least one reference point along the reference scale, wherein the reference point is scanned as an essentially analog signal progression (S), which consists of sequential first and second signal half-wave progressions (S1, S2), with the following steps:
    a) storing at least one first threshold (SW1) and one second threshold (SW2), wherein their levels are varyingly adjusted relative to each other,
    b) in a sectional interval of the first signal half-wave progression (S1):
    comparing the scanned values of the first signal half-wave progression (S1) with the first threshold (SW1) by means of a first comparator,
    outputting those scanned values of the first signal half-wave progression (S1)) that are less than the first threshold (SW1) to a first measured value register (MR1), and storing those values as a first discrete SW1 half-wave bit value, outputting those scanned values of the first signal half-wave progression (S1) that are greater than the first threshold (SW1) to the first measured value register (MR1), and storing those values as a second discrete SW1 half-wave bit value, c) in a sectional interval of the second signal half-wave progression (S2):

comparing the scanned values of the second signal half-wave progression (S2) with the second threshold (SW2) by means of a second comparator, outputting those scanned values of the second signal half-wave progression (S2) that are less than the second threshold (SW2) to a second measured value register (MR2), and storing those values as a first discrete SW2 half-wave bit value, outputting those scanned values of the second signal half-wave progression (S2) that are greater than the second threshold (SW2) to the second measured value register (MR2), and storing those values as a second discrete SW2 half-wave bit value, d) storing set measured values for the values in the sectional interval of the first signal half-wave progression (S1), and set measured values for the values in the sectional interval of the second signal half-wave progression (S2) in a respective first and second set measured value register (MRsoll1, MRsoll2), wherein the measured value registers (MR1, MR2) and set measured value registers (MRsoll1, MRsoll2) exhibit an identical bit length, e) comparing the respective contents of the first and second measured value register (MR1, MR2) with the contents of the first and second set measured value register (MRsoll1, MRsoll2) by means of a logical comparison module, and outputting a differential value from this comparison, and f) comparing the differential value with a predetermined tolerance range by means of a tolerance range comparator and, based on this comparison, acquiring and outputting each reference point as an ideal reference point if the differential value lies within a predetermined tolerance range.

9. The method according to claim 8, in which the reference points are designed as individual permanent magnets, whose respective magnetic field progression is scanned by the scanner.

10. The method according to claim 8, in which the reference points are designed as optical markings, which are scanned by the scanner.

11. The method according to claim 8, further involving the step of:

generating the set measured values based on at least one error detection simulation.

12. The method according to claim 8, further involving the step of:

generating the respective level of the first threshold (SW1) and level of the second threshold (SW2) based on at least one error detection simulation.

13. The method according to claim 8, in which the scanning time is prescribed based on the reference points at multiples of a 180° angle.

14. The method according to claim 13, in which the reference point is interpolated given a shift in the scanning point angle.

* * * * *